Patented Feb. 6, 1951

2,540,146

UNITED STATES PATENT OFFICE 2,540,146

METHOD FOR CONTROLLED BLENDING OF POLYSTYRENE WITH MODIFIERS

Kenneth E. Stober, Midland, Mich., assignor to The Dow Chemical Company, Midland, Mich., a corporation of Delaware Application May 27, 1948, Serial No. 29,595

5 Claims. (Cl. 260—41)

This invention relates to a continuous method for the controlled blending of used polystyrene or other extrudable thermoplastics with one or more modifying agents, to make a uniform product. It relates in particular to a method for producing uniformly colored polystyrene in a continuous manner.

It has long been a problem in the plastics arts to effect a uniform blending of plastics with one or more effect materials such as dyes, pigments, plasticizers, lubricants, stabilizers, fillers, and the like, especially when the intended constituents of the mixture are not capable of dissolving in a mutual solvent, or when it is necessary to effect the blending while the plastic is in either a solid or a fused condition. Prolonged grinding or tumbling of finely powdered plastic with finely divided solid modifiers (other than dyes) effects a reasonably satisfactory mixing in many cases, especially if the mixture is to be thermally processed as by extrusion or molding. This is a less satisfactory procedure, however, when dyes or pigments are to be mixed with such normally clear and transparent plastics as polystyrene, and especially when the amount of such coloring agent is small. The difficulty and expense of grinding polystyrene to a fine powder, and the prolonged mixing required to get a reasonably uniform color blend, combine to make the process impractical where strict uniformity is required. Even if a uniform blend of diverse sizes of solid particles is obtained, such mixtures tend to separate or "classify" on standing, with the finer particles usually sifting to the bottom of the pile. Similarly, any process which contemplates the uniform mixing of solid modifiers with molten polystyrene involves great difficulties because of the viscous character of the thermally fused mass. The widespread use of colored polystyrene has created a commercial problem of satisfying customer demand for a colored product to match exactly the shade and intensity of color of plastic molding granules produced at different times and often by different manufacturers. It is not sufficient that the average shade of a batch of molding granules be the one desired, but it is necessary that all granules in a batch be of the same shade and intensity of color, and often that such color is a true match for that in prior batches used by the same customer. A further practical requirement, to minimize the amount of equipment required to produce such blends, is that the method employed be of a continuous character so that the size of the equipment used is independent of the quantity of any particular blend to be produced therein. To minimize the number of times the polystyrene must be handled in producing such a blend, it is preferred that most of the polymer entering into the blend be freshly produced material which has never solidified and, hence, does not require an expensive and time-consuming grinding treatment before being mixed with the modifier.

It is accordingly among the objects of the invention to provide a continuous method for the production of uniform blends of polystyrene or other extrudable thermoplastics, and modifiers therefor. Another object is to provide a continuous method for the production of uniformly colored polystyrene. A further object is to provide a continuous method for producing colored polystyrene of a shade and intensity to match precisely the material so produced from time to time. A related object is to provide such a method which can be carried out in a single apparatus without regard to the quantity desired. Yet another object is to provide such a method which can be operated so as to change from one modifier to another, or from one quantity to another of the same modifier at will, without interrupting the continuity of production of molding granules.

According to the present invention, the foregoing and related objects may be attained, and a completely uniform blend of polystyrene, or other extrudable thermoplastic, and modifying agent may be produced by the following described method. A small amount of the powdered or granular thermoplastic, relative to the total amount of blended material to be produced, is mixed to a stage of approximate uniformity with the desired modifier in a ratio to provide a much higher concentration of modifier in this mixture (e. g. 20 to 50 times greater) than is desired in the final product. Most conveniently, the resulting powdered concentrate is extruded in strip form and cut into pellets of uniform size. These pellets are tumbled and mixed to assure uniform distribution through the mass of any pellets which individually contain more or less than the average amount of modifier. Thereafter, because of the uniform size of the pellets, there is no further physical self-classification, even on prolonged standing, and the pelleted premixed concentrate will provide a uniform source of the modifier. This concentrated pre-mix is fed through a continuous weighing device at a constant rate to an extruder which may be fed by several such devices and which is operated continuously in a starved condition and at a constant rate of discharge, so that there is a minimum holdup in the said extruder. The pre-mixed concentrate is fused in the extruder and is fed therefrom without cooling directly into a larger extruder of polymer-forwarding mixer, to which is fed continuously a supply of the unmodified thermoplastic, preferably in molten condition. The larger extruder is of the variable speed type, and is fitted with an orifice for producing a thin, and preferably sheet-like strip of polymer. The extruded strip is passed between the plates of a radio-frequency alternating current condenser, and the slightest variation in the mass of the strip alters the capacitance of the condenser. Such change is instantly recorded and is as instantly compensated, through a motor-driven rheostat in the power line which actuates the variable speed motor on the larger extruder, restoring the extruded strip to the desired constant mass. The desired ratio of modifier to thermoplastic is thus obtained by adjusting the rate of extrusion from the larger extruder, relative to the fixed rate of feed thereto of premixed concentrate through the smaller extruder, and maintaining this ratio, once attained.

When the desired amount of modifier in the final mixture is known in advance in arithmetical terms, the setting on the larger extruder is easily arrived at to obtain that ratio, using the formula:

$$\frac{\text{Known per cent modifier in pre-mix}}{\text{Desired per cent modifier in product}} = \frac{\text{required total extrusion rate}}{\text{known rate of feed of pre-mix}}$$

The fixed rate of feed of pre-mixed concentrate must be chosen so that the required total rate of extrusion is always less than the maximum capacity of the large extruder.

When the desired amount of modifier is an unknown quantity required to effect a particular property change in the extruded plastic, as is the case when matching the color intensity in a dyed or pigmented sample of the plastic, the rate of extrusion from the large extruder is varied gradually until examination of the product shows that the proper match has been made, and the controls are then set to maintain the so determined rate of extrusion.

The larger extruder, from which the strip of blended product is obtained, is preferably one having a mixing head therein, to augment the mixing normally occurring along the screw in a plastics extruder. Many such devices are known, most of which depend for their effectiveness upon mechanism designed to divide and remingle the streams of polymer one or more times, commonly between the extruder screw and the orifice. In one effective form, the mixing head comprises a series of rotating perforate discs mounted on an extension of the extruder screw, with interposed fixed perforate plates.

The method of the invention may be understood with reference to the accompanying drawing, the single figure of which is a diagrammatic representation of the flow of materials and of the controls used in the process.

A pre-mixed concentrate is prepared from reasonably finely ground polystyrene and the desired modifying agent. This may be done by tumbling the constituents together or in any other appropriate manner to produce a dry, free-flowing aggregate of reasonably uniform composition, and may, with advantage, be pelleted as previously described. This concentrate is fed from a vibrative feeder unit at a constant rate to a steadily moving belt conveyor mounted on an automatic weighing device which is represented in the drawing as a two-pan balance. The weight on the second pan is chosen to effect a balance when the weight of the concentrate on the belt at one time is equivalent to the desired hourly rate of feed of the concentrate to the extruder system. When too much of the concentrate falls on the belt, the opposite pan tends to rise, actuating a switch, which temporarily shuts off the vibrator and, hence, the flow of the concentrate. Inversely, when too little of the concentrate falls on the belt, the opposite pan settles and the switch is actuated to turn on the vibrator, loosing more concentrate on the belt. The concentrate falls from the belt directly through the hopper and into the worm of a starved, constant speed extruder wherein the plastic is melted and from which the concentrate is extruded into the barrel of a larger extruder having an ample supply of the plastic to be modified as its principal feed. There may be one or a plurality of the vibrative feeders and associated automatic weighers, supplying one or more of the constant speed starved extruders with the same or different concentrate, as required to produce the desired final blend. Each concentrate is diluted and mixed with the plastic in the worm of the large extruder and is further blended to uniformity in a mixing head, illustrated in the drawing as a series of perforated alternately rotating and alternately fixed discs. The so-blended plastic is extruded as a thin strip which passes between condenser plates on its way to a cutter where it is reduced by known means to a proper size for use as feed in molding or extrusion operations. The condenser is part of a radio-frequency circuit, connected with a recording and controlling instrument of known type. The slightest change in the amount of dielectric (plastic) passing between the plates effects an instantaneous response, through the controller, in a motor-driven rheostat in the power line to the variable speed motor which drives the large extruder, and the rate of extrusion is as instantly adjusted to restore the desired dimensions to the extruded strip. There being a fixed ratio of constituents in the concentrate or concentrates, a fixed rate of feed of the concentrates to the starved extruder, and a fixed rate of extrusion therefrom to the larger mixing extruder, it is seen that maintenance of a constant rate of extrusion from the large extruder assures uniformity of the product for as long as is desired, and that, since there is a small inventory of modifier present at any time, a very short time is required to purge the system of one modifier and to change to the production of another equally uniform blend of a different composition.

In a specific example, a pre-mixed concentrate was produced by tumbling together 50 pounds of titanium dioxide pigment and 150 pounds of clear small granules of polystyrene until the mixture was approximately uniform. This blend was extruded as a fine stream and cut into uniform pellets about 1/8 inch in diameter. These were tumbled in a rotary drum to distribute through the mass those pellets which differed individually from the average analysis of the concentrate. The pelleted concentrate was then fed at the constant rate of 16 pounds per hour from a vibrative feeder and automatic weigher, as described, into a constant speed 2.5 inch diameter screw extruder. The concentrate was delivered continuously from this extruder as a fused stream entering the barrel of a screw extruder of 6-inch diameter, having a variable speed drive. The 6-inch extruder was fed continuously a supply of clear, molten polystyrene under constant pressure from a heat-jacketed storage tank which, in turn, was supplied directly from a polymerization vessel. The larger extruder was equipped with the illustrated variety of mixing head and discharged the colored polystyrene as a strip 8 inches wide and 1/8 inch thick at a rate of 400 pounds per hour. The extruded strip passed between the plates of a ratio frequency condenser, as illustrated, and any dimensional variation was instantly translated into compensating changes in the rate of extrusion from the variable speed 6-inch mixing extruder. The rate of feed of 25 per cent pigmented concentrate was held constant at 16 pounds per hour and of final product at 400 pounds per hour, yielding a uniform white product containing exactly 1 per cent of the titanium dioxide pigment.

In another example, it was desired to reproduce a particular shade of opaque ivory color in polystyrene. This shade had white, yellow and red components. Three individual concentrates were prepared, in the manner described in the preceding example, as follows:

(1) Clear polystyrene, 180 pounds, and titanium dioxide pigment, 20 pounds.

(2) Clear polystyrene, 199.5 pounds, and a cadmium red pigment, 0.5 pound.

(3) Clear polystyrene, 198 pounds, and a cadmium lithopone lemon pigment, 2 pounds.

These were each mixed, extruded and pelleted as previously described, and, after the pellets of each concentrate had been tumbled to give random distribution of any off-average particles, each concentrate was fed from a separate vibrative feeder to its own automatic weigher and thence through individual small, constant speed extruders into a 6-inch extruder having a continuous and ample supply of molten polystyrene under constant pressure. The white concentrate was fed at the rate of 19 pounds per hour, the red concentrate at the rate of 16 pounds, 2 ounces per hour, and the yellow concentrate at the rate of 9 pounds, 10 ounces per hour, to produce the desired shade and intensity of color in the finished product which was obtained as a thin tape 8 inches wide at the rate of 400 pounds per hour. The product contained 0.475 per cent titanium pigment, 0.0102 per cent red pigment and 0.024 per cent lemon yellow pigment, and this analysis was maintained automatically by means of the condenser-actuated system for controlling the speed of the large extruder. After the desired amount of the ivory product had been obtained, a new set of concentrates was substituted for those here used, and balanced operation to produce a new desired shade was obtained within 30 minutes, by which time the entire system was purged of all remaining traces of the white, red and yellow concentrates.

The system described in the last example, in which each pigment (or other modifier) is fed as a concentrate through a separate feeder-weigher system, simplifies the color blending operation. It is possible, as well, to prepare a single concentrate containing all of the required modifying constituents, or to blend a plurality of premixed concentrates, and to feed the resultant product from a single feeder and through a single extruder into the large extruder or equivalent apparatus where it is mixed continuously with the plastic to be modified.

The examples have illustrated the introduction of controlled amounts of pigments into molten polystyrene. Dyes, plasticizers and other modifiers may be added in like manner to this or other extrudable organic thermoplastics, such as ethyl cellulose, vinyl chloride-acetate copolymers, vinylidene chloride copolymers, styrene-alpha-methyl styrene copolymers, and the like. The main supply of plastic to be modified has been described as a molten mass, but, with adequate mixing capacity in the larger blending extruder, the main feed thereto may be in the form of plastic powder or granules.

I claim:

1. The method which comprises providing at least one pre-mixed concentrate of polystyrene containing a constant amount of at least one modifying agent therefor, supplying each such concentrate at a constant rate to an extrusion zone, continuously extruding each such concentrate at the same constant rate at which it is supplied, to provide the desired final ratio of modifiers to one another, into a much larger mixing and extrusion zone, blending each concentrate therein with an amount of polystyrene to give the desired final ratio of each modifier to the polystyrene, extruding the so-formed blend as a thin strip from the last said zone, continuously applying a radio frequency potential across the moving dielectric strip issuing from said zone and measuring its electrical capacity, and instantaneously varying the rate of extrusion responsive to and in an amount proportional to and opposing any variations in said capacity, thereby compensating for any changes in the mass of dielectric and producing a continuous strip of uniformly modified polystyrene at essentially a constant rate.

2. The method which comprises continuously supplying at a constant rate to an extrusion zone a uniform pre-mixed concentrate of polystyrene and at least one modifying agent therefor, continuously extruding said concentrate at the same constant rate at which it is supplied, into a much larger mixing and extrusion zone, blending the concentrate therein with an amount of molten polystyrene to give the desired final ratio of modifier to polystyrene, extruding the so-formed blend as a thin strip from the last said zone, continuously applying a radio frequency potential across the moving dielectric strip issuing from said zone and measuring its electrical capacity, and instantaneously varying the rate of extrusion responsive to and in an amount proportional to and opposing any variations in said capacity, thereby compensating for any changes in the mass of dielectric and producing a continuous strip of uniformly modified polystyrene at essentially a constant rate.

3. The method as claimed in claim 1, wherein at least one of the pre-mixed concentrates consists of polystyrene and a coloring agent therefor.

4. The method as claimed in claim 1, wherein each pre-mixed concentrate has from 20 to 50 times the desired final concentration of its contained modifying agent in the polystyrene.

5. The method as claimed in claim 1, in which a plurality of pre-mixed concentrates is used, each containing a different color component of the desired final shade, and each being supplied at individual rates to give, in the blending operation, the desired final shade and intensity of color to the polystyrene.

KENNETH E. STOBER.

REFERENCES CITED

The following references are of record in the file of this patent:

UNITED STATES PATENTS

| Number | Name | Date |
|---|---|---|
| 2,051,781 | Brown | Aug. 18, 1936 |
| 2,156,895 | Godat | May 2, 1939 |
| 2,319,859 | Hale | May 25, 1943 |

OTHER REFERENCES

India Rubber World, June 1, 1941, pp. 34–38.

Certificate of Correction

Patent No. 2,540,146                                            February 6, 1951

KENNETH E. STOBER

It is hereby certified that error appears in the printed specification of the above numbered patent requiring correction as follows:

Column 1, line 2, for the word "used" read *fused*;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*